US007233635B2

(12) United States Patent
Lee et al.

(10) Patent No.: US 7,233,635 B2
(45) Date of Patent: Jun. 19, 2007

(54) APPARATUS AND METHOD FOR DIGITAL SYMBOL SYNCHRONIZATION

(75) Inventors: Seung-Hwan Lee, Daejon (KR); Eung Bae Kim, Daejon (KR); Nam Il Kim, Daejon (KR); Seung-Kwon Back, Gyeongsangbuk-do (KR)

(73) Assignee: Electronics and Telecommunications Research Institute (KR)

( * ) Notice: Subject to any disclaimer, the term of this patent is extended or adjusted under 35 U.S.C. 154(b) by 763 days.

(21) Appl. No.: 10/322,945

(22) Filed: Dec. 18, 2002

(65) Prior Publication Data

US 2003/0156671 A1 Aug. 21, 2003

(30) Foreign Application Priority Data

Feb. 18, 2002 (KR) ............... 10-2002-0008451

(51) Int. Cl.
*H04L 7/00* (2006.01)
(52) U.S. Cl. ............... 375/355; 375/344; 375/354
(58) Field of Classification Search ........... 375/355, 375/354, 316, 322, 324, 350; 348/555, 537
See application file for complete search history.

(56) References Cited

U.S. PATENT DOCUMENTS

| 5,425,057 | A | * | 6/1995 | Paff | .................. 375/326 |
|---|---|---|---|---|---|
| 5,550,869 | A | * | 8/1996 | Gurantz et al. | .............. 375/340 |
| 5,859,671 | A | * | 1/1999 | Kim | .................. 348/537 |
| 6,243,431 | B1 | | 6/2001 | Han | |
| 6,310,924 | B1 | | 10/2001 | Kang et al. | |
| 6,320,917 | B1 | * | 11/2001 | Stott et al. | .................. 375/344 |
| 6,456,677 | B1 | * | 9/2002 | Hiramatsu et al. | .......... 375/354 |
| 6,545,723 | B1 | * | 4/2003 | Han | .................. 348/555 |
| 6,643,321 | B1 | * | 11/2003 | Genossar et al. | ........... 375/219 |
| 2002/0051487 | A1 | * | 5/2002 | Yamada et al. | ............. 375/232 |
| 2003/0156671 | A1 | * | 8/2003 | Lee et al. | .................. 375/355 |

FOREIGN PATENT DOCUMENTS

| JP | 2001-196928 | 7/2001 |
|---|---|---|
| KR | 1996-0028394 | 7/1996 |
| KR | 1997-0004743 | 1/1997 |

* cited by examiner

*Primary Examiner*—David C. Payne
*Assistant Examiner*—Nader Bolourchi
(74) *Attorney, Agent, or Firm*—Blakely Sokoloff Taylor & Zafman

(57) ABSTRACT

A symbol synchronization apparatus and method for synchronizing symbol digitally is disclosed. In the present invention, digital symbols are generated by an A/D converting unit. Based on digital symbols, a symbol timing value is calculated. The symbol timing value is used for determining a best symbol timing. According to the best symbol timing, a clock phase is determined and A/D converting unit uses newly determined clock for generating digital symbols. As a result, the present invention can perform an over-sampling process in higher resolution than a sampling frequency by using only one A/D converter. Therefore, the present invention may increase economic efficient and reduce complexity of hardware.

16 Claims, 16 Drawing Sheets

DIGITAL SYMBOL SYNCHRONIZATION APPARATUS IN ACCORDANCE WITH THE PREFERRED EMBODIMENT OF THE PRESENT INVENTION

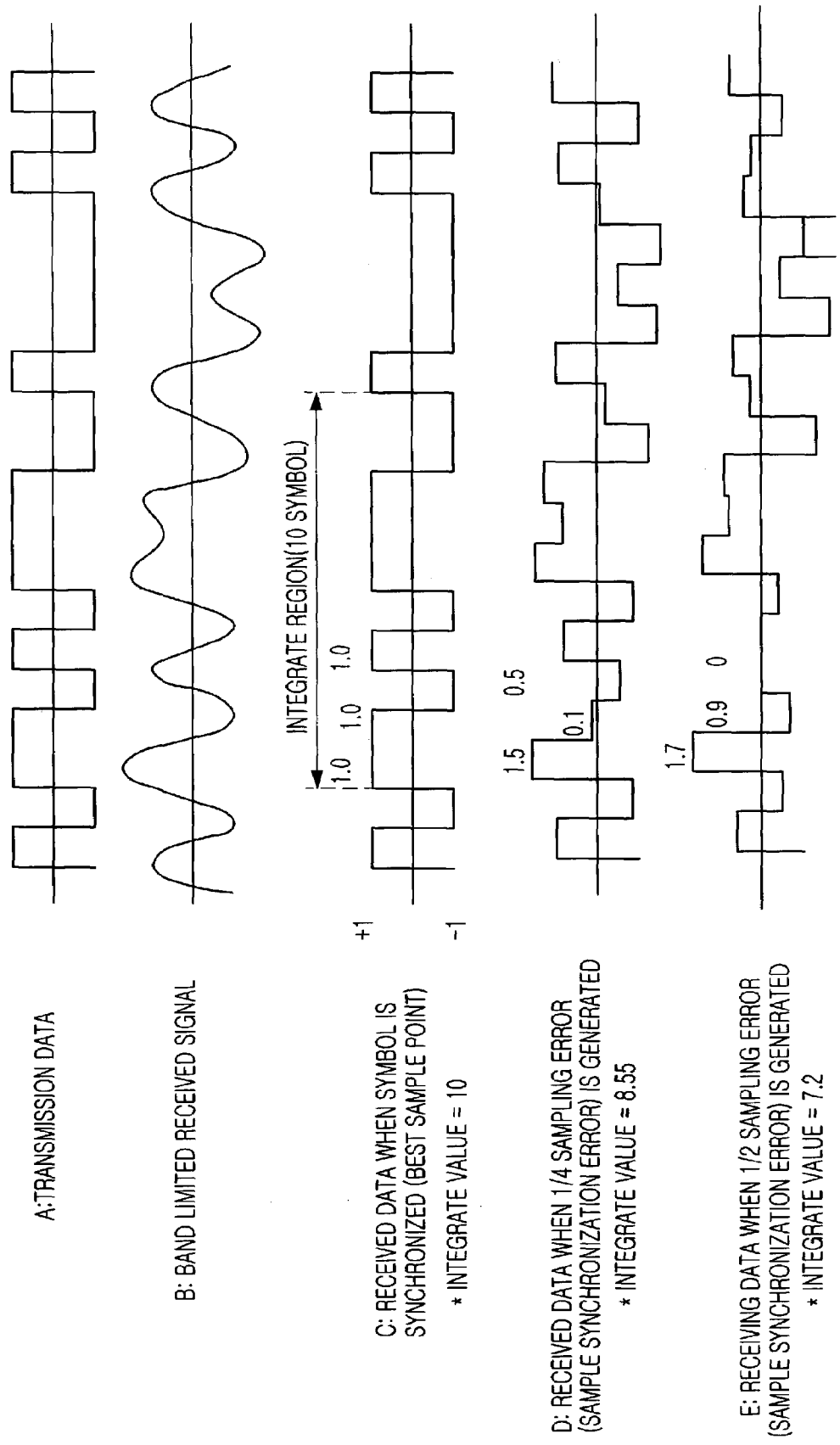

OUTPUT CHARACTERISTIC CURVE OF THE
SYMBOL TIMING CALCULATOR 200

OUTPUT CHARACTERISTIC CURVE OF THE
SYMBOL TIMING CALCULATOR 200

OUTPUT CHARACTERISTIC CURVE OF THE
SYMBOL TIMING CALCULATOR 200

APPARATUS AND METHOD FOR DIGITAL SYMBOL SYNCHRONIZATION

FIELD OF THE INVENTION

The present invention relates to an apparatus and method for synchronizing symbols between a transmitter and a receiver in a digital communication system; and, more particularly, to an apparatus and method for digital symbol synchronization in which only one A/D converter is used and a higher resolution than a sampling frequency is provided.

DESCRIPTION OF RELATED ARTS

Recently, a digital signal processing technology has been incredibly developed and it has led to replace various analog signal processing. Likely, a conventional analog synchronization process has been tried to be replaced by a digital synchronization process and plenty of digital algorithms for symbol synchronization has been proposed.

In a digital communication system, a high-speed A/D converter and a high sampling frequency are required for processing data since a transmitter and a receiver exchange data in high-speed. As growing the speed of data transmission, a symbol interval becomes narrower. For performing A/D conversion of high speed data and performing over-sampling process in the narrow symbol interval, a sampling resolution must be high. Accordingly, a digital processing speed also needs to be fast.

Moreover, there are more reasons for demanding of high sampling resolution. At first, the high sampling resolution is required for gaining similar performance comparing to the conventional analog symbol synchronization process. Secondly, the sampling resolution should be high for preventing decrement of a performance corresponding to timing errors in a case of a quadrature amplitude modulation (QAM), which involves modulated digital signals having a lot of levels.

FIG. 1A is a graph illustrating a relation of an over-sampling ratio versus a performance for selecting an adequate sampling frequency of an A/D converter. As shown in FIG. 1A, the performance is continuously improved corresponding to the over-sampling ratio, however, the performance is saturated after a certain point of over-sampling ratio. That is, the over-sampling ratio may not affect to the performance after the over-sampling ratio exceeds the certain point. FIG. 1B is a graph illustrating a relation of a sampling frequency versus a cost for selecting an adequate sampling frequency of an A/D converter. As shown in FIG. 1B, after passing a certain point of the sampling frequency, the cost is getting incredible higher. Therefore, it is very complicated matter to find an adequate sampling frequency comparing to the cost and the performance.

Orihashi et al. discloses a technique for providing an appropriate sampling resolution by using a low-price A/D converter at JAPAN Laid-open Application No. 2000-010009 (hereinafter Orihashi). FIGS. 2A and 2B describe Orihashi's patent and a principle thereof. FIG. 2A is a block diagram depicting Orihashi's apparatus for providing a higher sampling resolution to a digital signal process system by using a conventional low price A/D converter. FIG. 2B is graphs illustrating an output characteristic curve and waveforms for explaining a concept of the conventional apparatus in FIG. 2A.

While an A/D converter converts analog signals to digital signals, a signal is distorted and timing error is occurred. For preventing the signal distortion and the timing error, the Orihashi's patent uses a plurality of A/D converters. In the Orihashi's patent, each A/D converter receives an A/D clock having a uniform phase variation with neighbor A/D converters.

Reasons of using a plurality of A/D converters in the Orihashi's patent are explained in detail as follows. For example, if 40 MHz of a sampling frequency and 10 MHz of a symbol rate are used in the system, an A/D converter converts received analog signals to digital signals by performing a sampling process of- the received analog signals in every 10/40 of one symbol interval. That is, the A/D converter outputs four samples per one symbol. If eight or more samples per one symbol are required, then the sampling frequency should be higher than 80 MHz. However, there are limitations for increasing the sampling frequency in the digital signal process such as a physical limitation and a high expense in accordance with the Orihashi's patent.

Therefore, the Orihashi's patent uses two or more A/D converters for obtaining four or more samples with one symbol interval. Each A/D converter receives the A/D clock signal by uniformly shifting a sampling frequency of 40 MHz. For example, if four A/D converters are used, the sampling frequency of 40 MHz is shifted to 0°, 90°, 180° and 270° and shifted sampling frequencies are inputted to each corresponding A/D converter. By using four A/D converters, sixteen samples with one symbol interval should be gained. Therefore, four A/D converter using the 40 MHz sampling frequencies output a result same as one converter using 160 MHz sampling frequency.

The Orihashi's patent uses four A/D converters, an additional phase delayer and a data buffer for performing over-sampling process in one symbol interval and maintaining an equal interval of each shifted phase. Such a configuration of the Orihashi's patent can output sixteen samples in a symbol interval, which can be generated by one A/D converter with 160 MHz sampling frequency.

As mentioned above, the high cost problem of generating high sampling frequency may be reduced by using the conventional apparatus in FIG. 2A. For example, if 40 MHz A/D converter is five dollars and 160 MHz A/D converter is fifty dollars, then twenty dollars of four 40 MHz A/D converters may produce same performance as fifty dollars of a 160 MHz A/D converter. The additional apparatus will cost little more but we can still reduce a cost.

As shown in FIG. 2A, A/D clock signals are inputted simultaneously to each corresponding A/D converter using the shifted sampling frequency. As a result, more samples can be gained than actual sampling frequency used in the A/D converter as shown in FIG. 2B. The above-mentioned example outputs samples in one symbol interval as many as an A/D converter using a 160 MHz sampling, frequency outputs.

The Orihashi's patent still has problems to overcome. The cost for synchronization is still high and an integration problem is arisen since a plurality of A/D converters and additional elements are used. However, if an enhanced algorithm is used in an A/D converter, a plurality of A/D converter is not necessarily to be used since there is only one sampling position among over-sampling samples in one symbol interval used for demodulation in the A/D converter. Therefore, if the A/D converter uses the enhanced algorithm for selecting the best sampling position, there is no reason to use a plurality of A/D converters.

In a mean time, there are other methods for a symbol synchronization that controls not only a carrier frequency and a phase, but also a phase of digital clock for the symbol synchronization by fusing a loop, wherein the loop controls an analog voltage controlled oscillator (VCO). The methods are introduced at U.S. Pat. No. 6,243,431, issued to Han, on Jun. 5, 2001 (hereinafter Han) and U.S. Pat. No. 6,310,924. issued to Kang et al., on Oct. 20, 2001 (hereinafter Kang).

The Han's patent relates to an apparatus and method for symbol synchronization in a digital signal process system using an A/D converter. For providing an object of the Han's patent, the apparatus of Han includes an A/D converter and a symbol timing recovery apparatus. The A/D converter samples an I-channel/Q-channel signal according to a sampling clock and generates digital data, wherein the sampling clock is obtained from the symbol timing recovery apparatus.

The symbol timing recovery apparatus generates the sampling clock for maintaining an adequate sampling position during sampling an analog signal to a digital signal at the A/D converter. The symbol timing recovery apparatus contains a clock generator, an average detector, pre-processing filters, two square calculators, an adder and a narrow-band detector. The A/D converter outputs A/D converted I-channel data and Q-channel data to the pre-processing filters, which are narrow-band filters of which the center frequency corresponds to one-half of a symbol rate. The pre-processing filters pass signal components necessary for the symbol timing recovery to the square calculators and remove other signal components. The two square calculators square output data of the pre-processors and output squared data to the adder. The adder adds the squared data. As a result, a sum of the squared data is consisted of DC and a sine wave having a symbol rate frequency. Therefore, the sum of the squared data needs to be passed a narrowband pass filter for eliminating DC. The sum of squared data, which is an output of the adder, passes through the narrow-band filter having the same center frequency as the symbol rate and becomes a sinusoidal wave signal having a frequency substantially the same as the symbol rate. The average detector receives the sinusoidal wave signal of narrow-band filter and detects a positive-going zero-crossing point (PGZP). The clock generator receives a symbol timing period and determines an exact sampling point corresponding to a quarter of the symbol timing period from the average PGZP. That is, the clock generator determines an interval between the average PGZP and the sampling point as a sampling period and generates a sampling clock based on the sampling point and sampling period. The sampling clock is fed back to the A/D converter. Finally, the best-suited sampling position continuously maintained during sampling the digital signal at the A/D converter.

The Han's patent uses a closed circuit in order to compensate not only the clock timing error but also errors generated by a clock drift between a transmitter and a receiver. However, a performance of the closed circuit is not stable. The performance of the: closed circuit depends on parameters. It is a delicate process to setup parameters of the closed circuit for maintaining stable performance. If parameters are setup adaptable, the performance of the closed circuit is outperformed and desired result will be gained but if not, the result will be very worse. Furthermore, the closed circuit controlling method can be implemented only when the received signals are inputted continuously and it cannot be implemented when the received signals are inputted non-continuously such as packet type communication.

The Kang's patent relates to an improved digital demodulator which is capable of simplifying an application specific integrated circuit of a demodulator using a combined sampling technique. In the Kang's patent, two A/D converters for I-channel and Q-channel are equipped when an input signal is a baseband signal. The two A/D converters receive an intermediate frequency (IF) by converting the baseband signal to the IF signal since the baseband signal is difficult to be maintained an orthogonality of the I-channel and Q-channel. During converting the baseband signal to the IF signal, a frequency drifter or variation are compensated first and then inputted to the A/D converters. The A/D converters output converted signal to a demultiplexer. Inhere, a sampling frequency four times higher then the IF is used as a clock in the A/D converter. For example, if the IF is 40 MHz, the A/D converter sampling frequency is 160 MHz.

A reason of using the four time higher sampling frequency than the IF is that a sine wave has a value of (0,1,0,−1) and a cosine wave has a value of (1,0,−1,0) in case that the sampling of sine waves and cosine waves are performed at 0°, 90°, 180° and 270°. In other words, if the sine value is 0, the cosine value will be either 1 or −1 and vice versa.

Therefore, the demultiplexer easily separates an I-channel and a Q-channel value by appropriately multiplying 1 and −1. That is, outputs of the A/D converter are I0, Q0, −I0, −Q0, I1, Q1, −I1, and −Q1 etc. , and if (+1, +1, −1, −1) is multiplied to the outputs, we can get I0, Q0, I0, Q0, I1, Q1, I1 and Q1 etc. If we separate the I-channel values and the Q-channel values, we can get the. I-channel values I0, I0, I1 and I1 and the Q-channel values Q0, Q0, Q1 and Q1. Therefore, the IF signal is demodulated to a baseband I and Q channel signal without a complicated multiplexer and a sine wave generator.

After demodulation, an output signal of the demultiplexer is passed through a frequency/phase difference detector and an analog oscillator and as a result, frequency/phase difference of the output signal is compensated.

However, the Kang's and Han's patents have disadvantages. Both patents use the closed loop. It is very complicated to control parameter of the closed loop. Also, it cannot be implemented to non-continuous data communication such as a burst packet type communication.

SUMMARY OF THE INVENTION

It is, therefore; an object of the present invention to provide an apparatus and method for synchronizing digital symbol by directly controlling a phase of clock inputted to an A/D converter and using digital samples.

In accordance with an aspect of the present invention, there is provided an apparatus for digital symbol synchronization, including: a A/D converting unit for over-sampling an analog signal to a digital signal according to an Analog/Digital (A/D) clock and outputting over-sampled symbols; a symbol timing calculating unit for calculating a symbol timing value in one sample interval based on the over-sampled signal by receiving the over-sampled signal and outputting the symbol timing value; a symbol timing determining unit for determining a best symbol timing based on the symbol timing value and outputting the best symbol timing; and an A/D clock supplying unit for receiving the best symbol timing and supplying an A/D clock to the A/D converting unit, wherein the A/D clock is determined according to the best symbol timing.

In accordance with an aspect of the present invention, there is also provided a method for digital symbol synchronization, including the steps of: a) generating over-sampled symbols by over-sampling an analog signal to a digital signal according to an Analog/Digital (A/D) clock; b) calculating a symbol timing value based on the over-sampled symbols; c) determining a best symbol timing based on the symbol timing value and d) supplying the A/D clock according to the best symbol timing.

BRIEF DESCRIPTION OF THE DRAWING(S)

The above and other objects and features of the present invention will become apparent from the following description of the preferred embodiments given in conjunction with the accompanying drawings, in which:

FIG. 6 is illustrating waveforms of signal according to a sampling error used in the present invention for explaining a principle of the symbol timing calculator in FIG. 5;

FIG. 8C is a graph showing an output characteristic curve of the symbol-timing calculator 200 for explaining a principle of the symbol timing determiner 300 in FIG. 8a;

DETAILED DESCRIPTION OF THE INVENTION

Other objects and aspects of the invention will become apparent from the following description of the embodiments with reference to the accompanying drawings, which is set forth hereinafter.

Figure 1A:
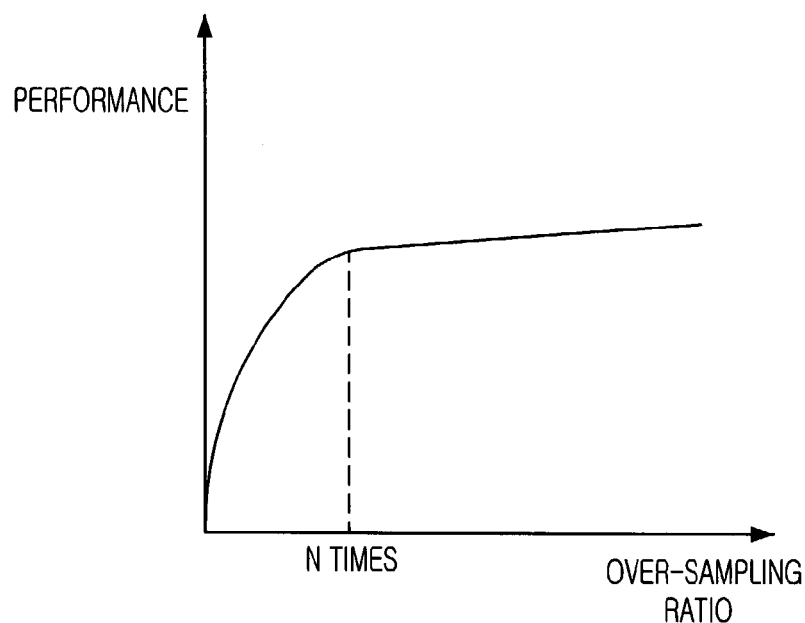
FIG. 1A is a graph illustrating a relation of an over-sampling ratio versus a performance for selecting a sampling frequency of an A/D converter.
Figure 1B:
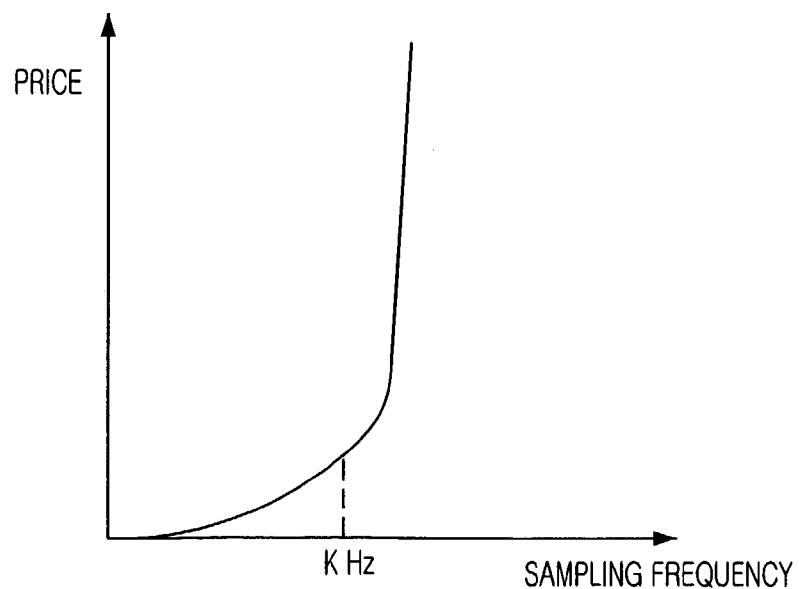
FIG. 1B is a graph showing a relation of an over-sampling frequency versus a cost for selecting a sampling frequency of an A/D converter.
Figure 2A:
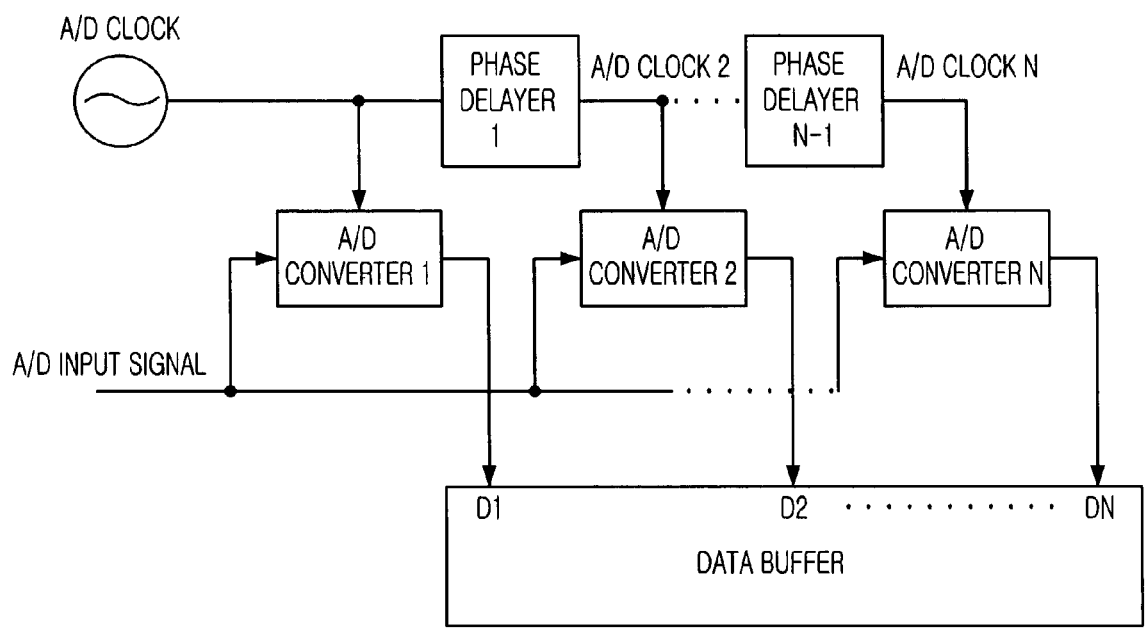
FIG. 2A is a block diagram depicting a conventional apparatus for synchronizing symbols and increasing a sampling resolution in a digital signal process system using conventional A/D converter.
Figure 2B:
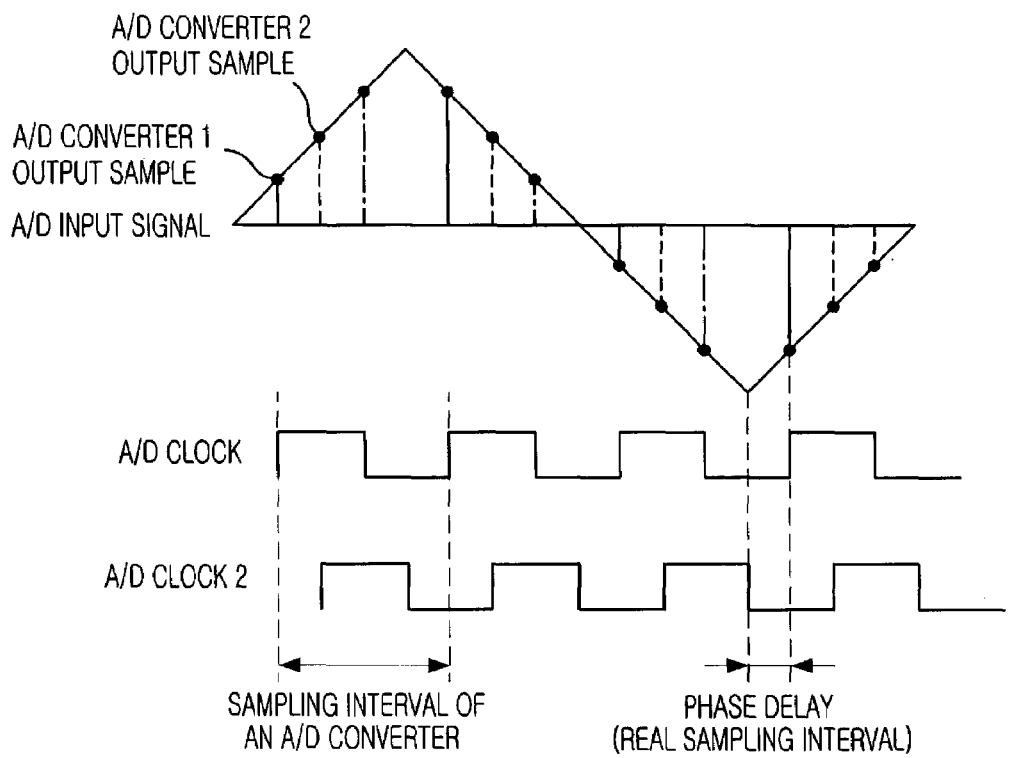
FIG. 2B is graphs for explaining a concept of the conventional apparatus in FIG. 2A.
Figure 3:
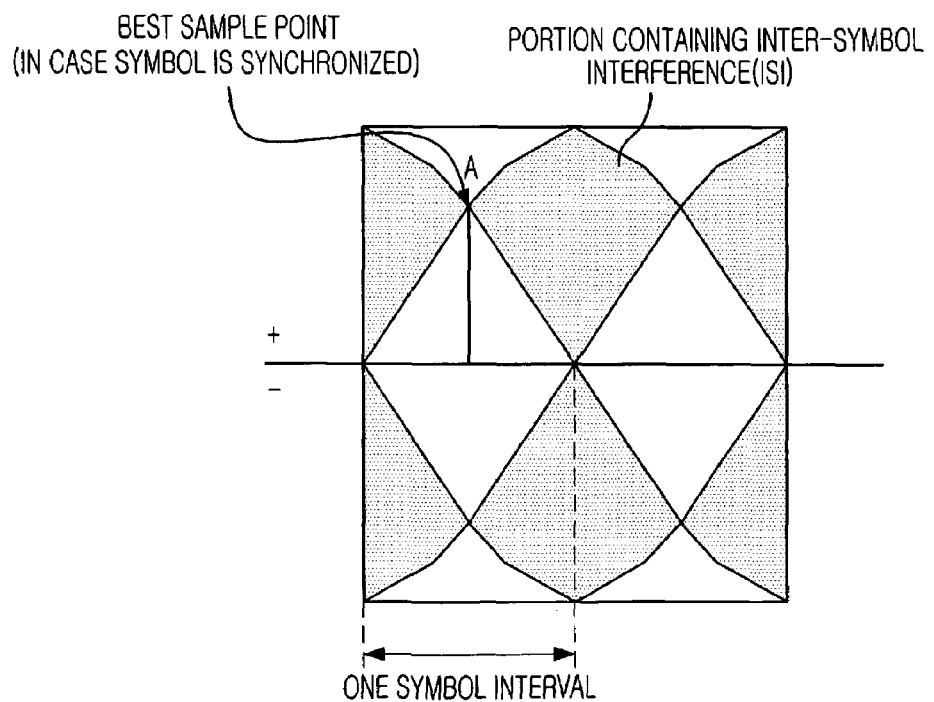
FIG. 3 is an eye diagram of a band-limited signal for explaining a principle of the present invention.

FIG. 3 is an eye diagram of a band-limited signal for explaining a principle of the present invention.

Referring to FIG. 3, an eye is opened largest at a point 'A'. The point 'A' is the best point suitable for symbol synchronization. The present invention finds the point 'A' for the symbol synchronization by calculating an integration value of sampling points. For example, since the eye diagram is symmetrical by a horizontal line, the point 'A' can be found by calculating integration value of sampling points in one of a positive region and a negative region. After calculating the integration value of sampling points in the positive region of the eye diagram, if a specific sampling point has the biggest integration value, then it is the best suitable point of symbol synchronization and the point at which an eye opening is largest in the eye diagram.

Referring to the eye diagram of FIG. 3, the largest opened eye in FIG. 3 is very similar to an output characteristic curve of a symbol integrator of the present invention. For example, beside of the best sampling point, there is an inter-symbol interference (ISI) generated from neighbor symbols. However the ISI is not affect to a mean of an integration value of the sampling points. Because sings of bits (positive or negative) received in a predetermined interval are generated with same possibility therefore, if integration values of each sampling point in the predetermined interval are calculated, the ISI does not affect to a mean of integration value. That is, since a mean value of a random binary sequence is 0, all elements interfering the neighbor symbols affects to the output characteristic curve of the symbol integrator as additional elements in a predetermined interval.

The additional elements have same characteristic of a Gaussian noise whose mean is 0 and which has a constant electric power. The above-mentioned characteristic of the integration values of sampling point is used for excluding an affection of the noise, which will be explained later. The integration value output of each sampling point forms as an isosceles triangle having the maximum value as the maximum synchronization point. In other words, the present invention finds a vertex of the characteristic curve for the symbol synchronization.

Figure 4:
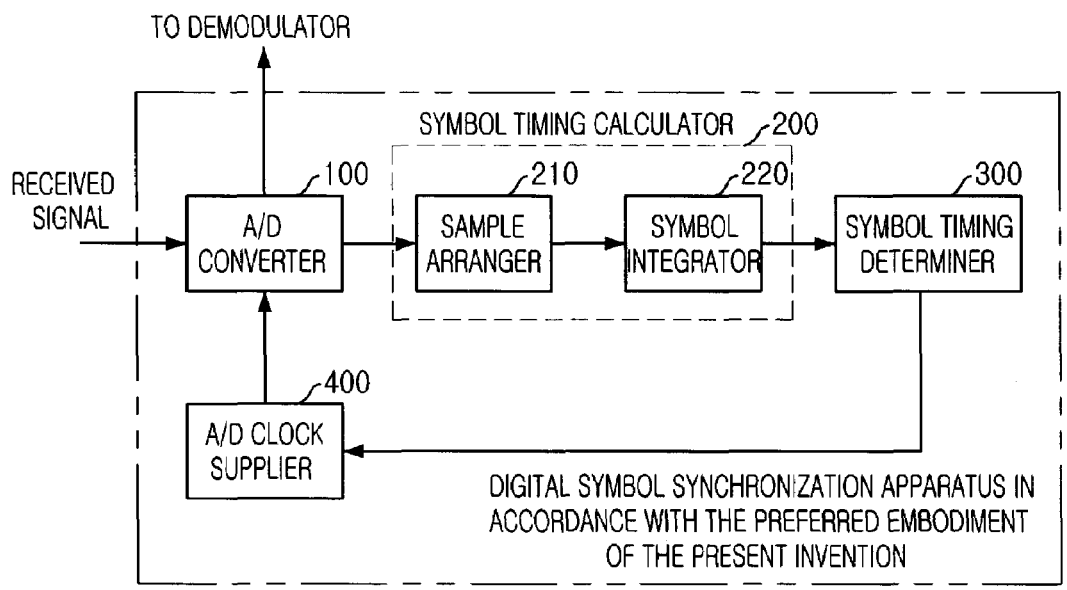
FIG. 4 is a diagram illustrating a symbol synchronization apparatus of a digital communication system in accordance with a preferred embodiment of the present invention.

FIG. 4 is a diagram illustrating a symbol synchronization apparatus of a digital communication system in accordance with a preferred embodiment of the present invention.

Referring to FIG. 4, the digital symbol synchronization apparatus includes an A/D converter 100, a symbol timing calculator 200, a symbol timing determiner 300 and an A/D clock supplier. The symbol timing calculator 200 contains a sample arranger 210 and a symbol integrator 220.

A detailed explanation of elements of the apparatus is follows.

The A/D converter 100 receives an analog signal and converts the analog signal to a digital discrete signal according to an A/D clock by performing an over-sampling process for having two or more samples per a symbol. The A/D clock is supplied from the A/D clock supplier. The A/D converter 100 outputs over-sampled symbols to the symbol timing calculator 200.

The symbol timing calculator 200 receives the over-sampled symbols from the A/D converter 100. The symbol timing calculator 200 calculates a symbol timing value within certain intervals based on the over-sampled symbols and outputs the symbol timing value to the symbol timing determiner 300. The symbol timing calculator 200 includes the sample arrange 210 and the symbol integrator 220.

The sample arranger 210 receives the over-sampled symbols and classifies the over-sampled symbols of which phases are the same based on a phase of the over-sampled symbols. In other words, the over-sampled symbols are classified into a first sample group, a second sample group, . . . , and $N^{th}$ sample group in a case that N over-samplings are performed. Each sample group contains the over-sampled symbols in one symbol cycle and is a set of the samples having the same phase in one symbol cycle. The sample arranger 210 outputs classified symbols.

The symbol integrator 220 receives the classified symbols and accumulates absolute values of the classified symbols by adding each absolute value of the classified symbols for a predetermined time. And the symbol integrator 220 outputs integrated values as a symbol timing value. The predetermined time for integration must be N times of a symbol interval, wherein N is a natural number.

The symbol timing determiner 300 receives the symbol timing value and determines a best symbol timing based on the symbol timing value.

The A/D clock supplier 400 receives the best symbol timing and generates the A/D clock signal based on the symbol timing.

The symbol timing determiner 300 and the A/D clock supplier will be explained in later referring to the FIGS. 8B, 10A and 10C.

The symbol integrator 220 computes the absolute values of the classified symbols. A reason of computing the absolute value is for calculating an integration value of the classified symbols. Generally, a symbol received in a digital communication system has a sign, a positive or negative, and the number of the positive symbols and negative symbols are same in a predetermined interval. Therefore, if the integration value of received symbols is computed without considering the sign of the symbol, a result will be always 0.

Furthermore, a reason of computing the integration value is as follows. Noises are always existed in the communication system and the noises are major factor affecting a performance of the communication system. Also, in the digital communication system, the over-sampled symbols always include not only desired signals but also the noise. However, a mean value of additional noise is 0 and amplitude of noise depends on a variance. That is, a sampled value at a certain point may have a value more than 0 but if the sampled value is added during a predetermined number of symbol intervals, a mean value of noises affecting to a signal level can be ignored. Therefore, the noise affection can be ignored to determine the received signal. A noise power is always exist without considering of integration and affects the performance as a signal-to-noise ratio. In other words, the symbol integrator 30 performs a function of a low pass filter (LPF) corresponding to a loop filter used in a conventional closed loop control method.

Figure 5:
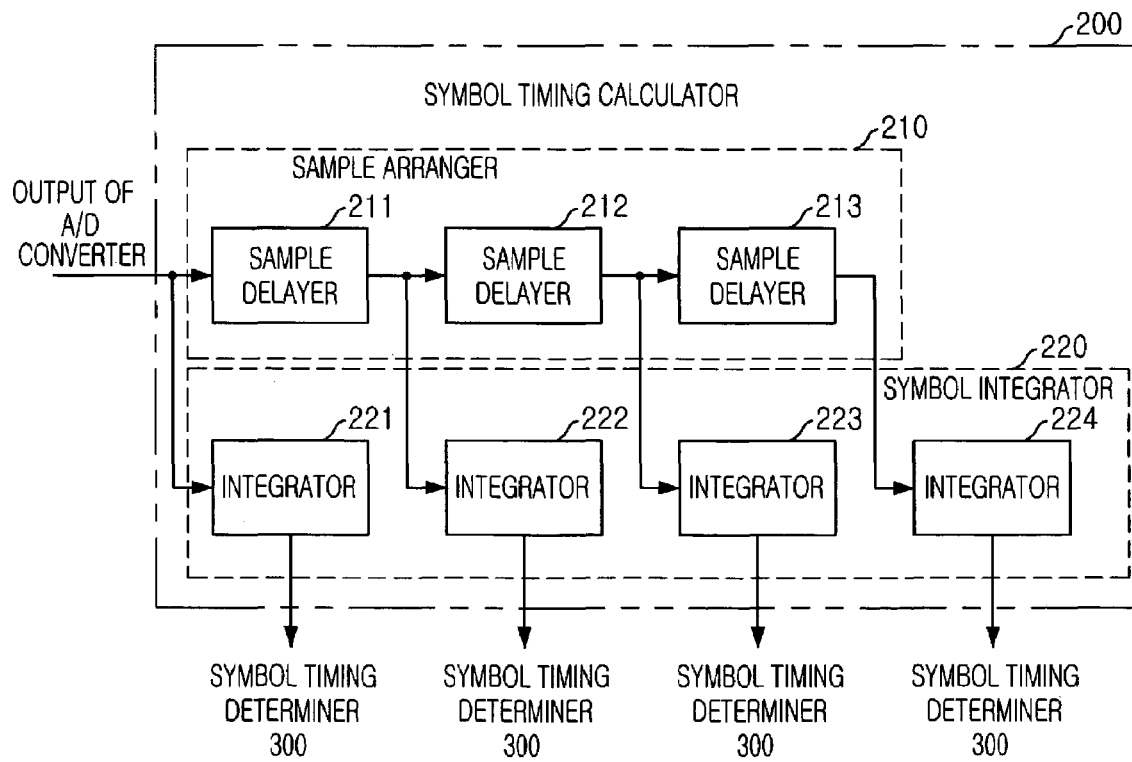
FIG. 5 is a detailed diagram showing the symbol timing calculator 220 in accordance with a preferred embodiment of the present invention.

FIG. 5 is a detailed diagram of the symbol timing calculator 220 in accordance with a preferred embodiment of the present invention with an assumption that four times over-sampling are performed in a symbol interval.

Referring to the FIG. 5, the symbol timing calculator 220 includes the sample arranger 210 and the symbol integrator 220 as mentioned above.

The sample arranger 210 contains sample delayers 211 to 213 and the symbol integrator 220 has integrators 221 to 224. The sample arranger 210 receives the over-sampled symbols outputted form the A/D converter 100 and the over-sampled symbols are sequentially passed through the sample delayers 211 to 213. By each delayer, the over-sampled symbols are gradually delayed and before the over-sampled symbols are inputted to each delayer, a delayed over-sampled symbols are inputted to corresponding integrator.

The integrators 221, 222, 223 and 224 receives the delayed over-sampled symbols from corresponding sample delayers and obtains an absolute value of the delayed over-sampled symbols. The integrator accumulates the absolute value and outputs an integration value as the symbol timing value to the symbol timing determiner 300. A method for symbol synchronization at points of over-sampled sample values is introduced in U.S. Pat. No. 4,794,624 issued to Braun et al. on Dec. 8, 1986, therefore, detailed explanation is omitted in here.

Figure 7A:
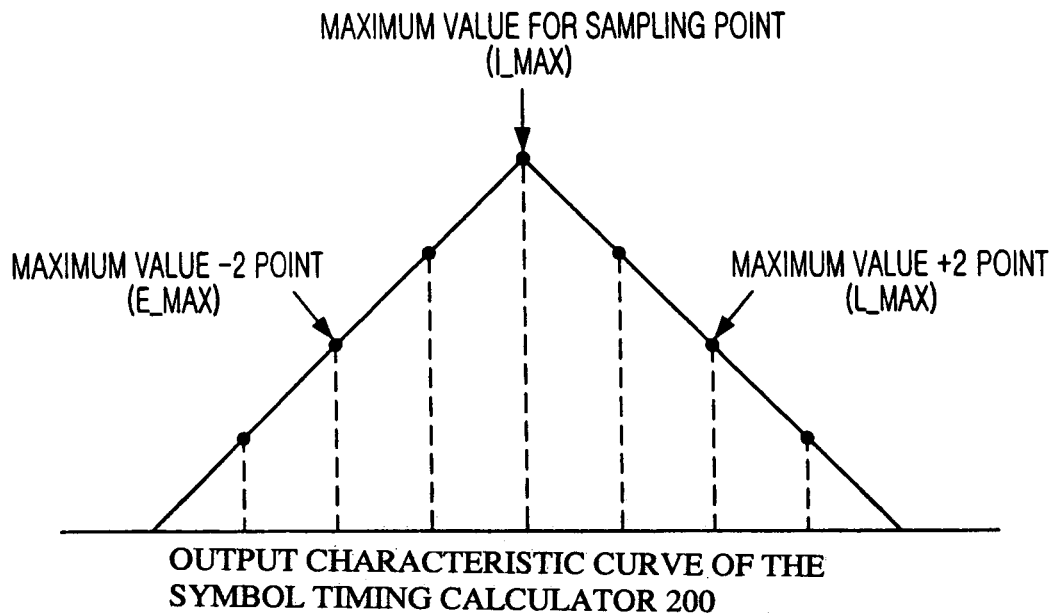
FIG. 7A is a graph showing an output characteristic curve of the symbol timing calculator 200 in case a digital data value sampled at the A/D converter is matched exactly with a symbol timing in accordance with a preferred embodiment of the present invention.
Figure 7B:
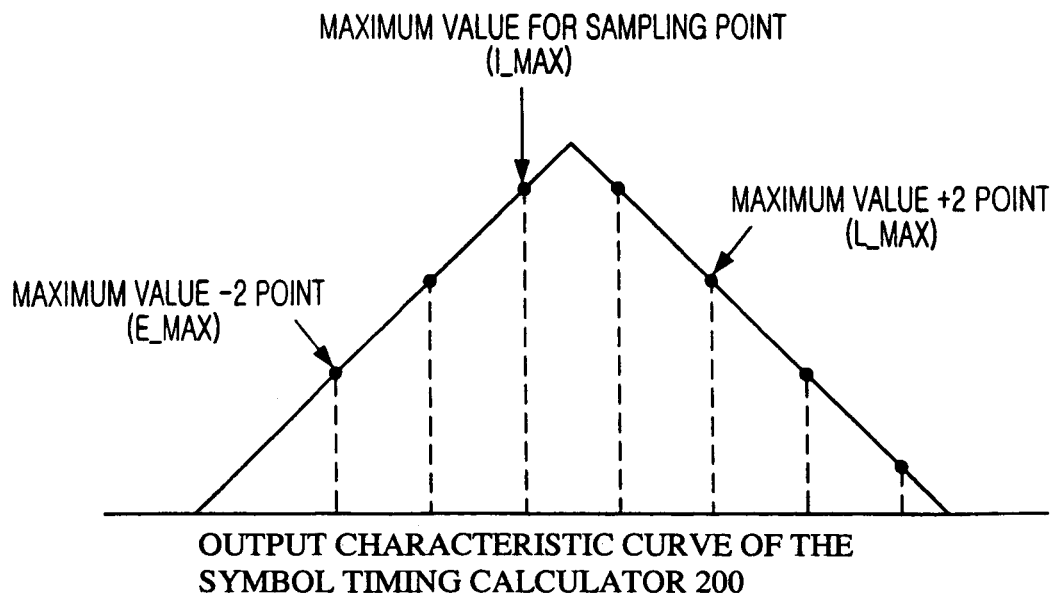
FIG. 7B is a graph representing an output characteristic curve of the symbol timing calculator 200 in case a digital data value sampled at the A/D converter has ½ sample difference with a symbol timing in accordance with a preferred embodiment of the present invention.

FIGS. 6, 7A and 7B are graphs for helping to understand a principle and preferred embodiment of the present invention.

FIG. 6 is graphs illustrating signal waveforms according to a sampling error used in the present invention for explaining a principle of the symbol timing calculator in FIG. 5.

In FIG. 6, 'A' is a waveform of a transmission data generated in a transmitter and 'B' is a waveform of a band-limited signal received at a receiver. 'C' in FIG. 6 shows a waveform of received data and integrated value (10) in a case that a symbol is synchronized (the best sampling point), 'D' in FIG. 6 shows a waveform of received data and integrated value (8.55) in case a symbol synchronization error is generated by a sampling error as much as ¼ symbol and 'E' in FIG. 6 shows a waveform of received data and integrated value (7.2) in case a symbol synchronization error is generated by a sampling error as much as ½ symbol.

FIGS. 7A and 7B show an output characteristic curve in case of performing eight times over-sampling within one symbol interval. FIG. 7A is a graph showing an output characteristic curve of the symbol timing calculator 200 when a digital data value sampled at the A/D converter is exactly matched with a symbol timing in accordance with a preferred embodiment of the present invention. FIG. 7B is a graph depicting an output characteristic curve of the symbol timing calculator 200 when a digital data value is sampled at the A/D converter having ½ sample difference with a symbol timing in accordance with a preferred embodiment of the present invention.

The output characteristic curve of the symbol-timing calculator in FIG. 7A is the ideal output characteristic curve. When an input clock of the A/D converter 100 and the maximum value of the symbol are exactly matched, the ideal output characteristic curve as like as FIG. 7A could be shown. However, in the most case, the clock of the transmitter and the receiver are different so it is almost impossible to find accurate maximum sampling point (I_MAX).

FIG. 7B shows the worst output characteristic curve that the maximum sampling point (I_MAX) is maximally deviate. In real environment of digital communication, values between in FIGS. 7A and 7B are shown in uniform distribution.

When the I_Max and the maximum value of the symbol are matched exactly, if FIGS. 7A and 7B are compared, there is no difference between a value of a L_Max point, which is two samples behind of the maximum sampling point (I_Max), and a value of an E-Max, which is two sample ahead of the maximum sampling point (I_Max). However, as shown in FIG. 7B, if the maximum value of symbol and the I_Max are not matched, the values of L_Max and E_Max are not same. In here, values of two samples behind or ahead of the I_Max are adduced for explaining the preferred embodiment of the present invention and it may be any sampless behind or ahead of the I_Max. The above-mentioned characteristic can be used for gaining a characteristic curve of FIG. 8A.

Figure 8A:
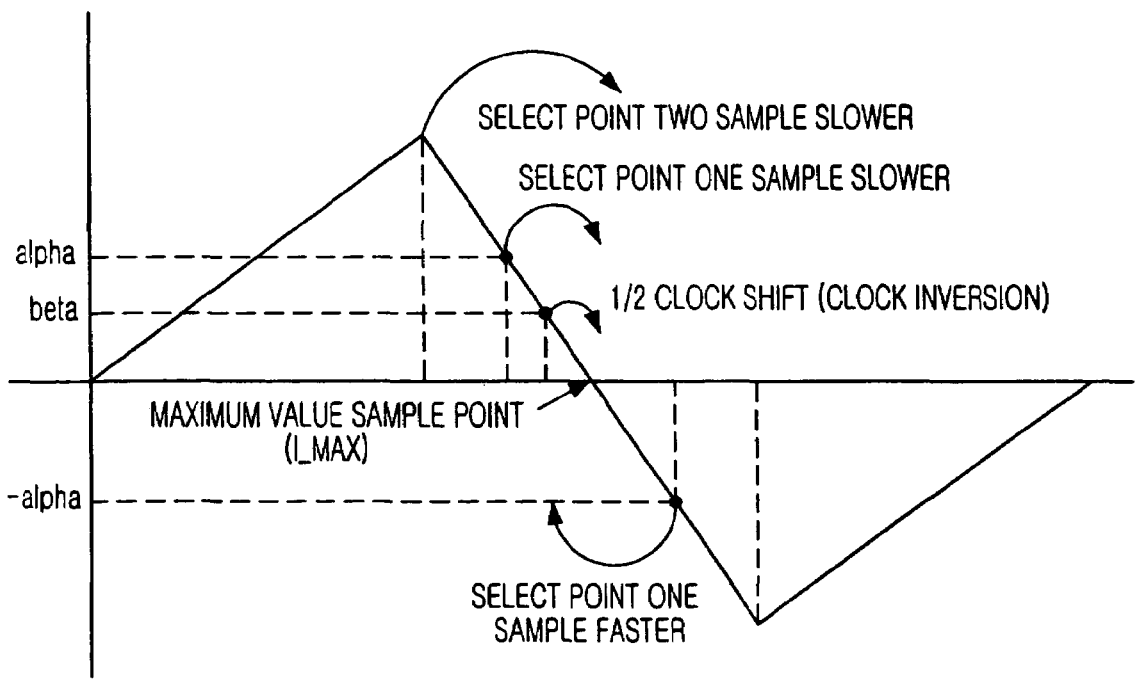
FIG. 8A is graph for explaining a principle of the symbol timing determiner 300 in accordance with a preferred embodiment of the present invention.

FIG. 8A is a graph for showing a principle of the symbol timing determiner 300 in accordance with a preferred embodiment of the present invention and it shows Max-estimation values calculated by subtracting the L_Max from the E_Max(E_Max−L_Max), wherein the E_Max and L_Max is determined based on the I_Max.

If the Max-estimation value is 'alpha' in FIG. 8A, the symbol timing determiner 300 selects one sample behind point of the I_Max as a Max-point and notices the Max-point to the A/D clock supplier 400. Adversary, if the Max-estimation value is '- alpha', the symbol timing determiner 300 selects one sample ahead point of the I_Max as a Max-point and notices the Max-point to the A/D clock supplier 400.

In a meantime, when a difference between the L_Max and E_Max is less than 1 and larger than 0 such as 'beta' in FIG. 8A, the symbol timing determiner 300 notices information of the value 'beta' to the A/D clock supplier 400. If the A/D clock supplier 400 is only consisted of the digital clock generator 410, an inverter 210, a multiplexer 430 and if the Max-estimation value is 'beta', then clock signal is shifted to ½. That is, a phase of clock inputted to the A/D converter 100 is shifted by 180 degree for matching the I_Max to, the best point of symbol synchronization.

For the reference, in case the A/D converter 100 converts an analog signal to digital signal, the present invention can give same affection using two times better resolution than currently used sampling frequency by inversing the clock signal since the analog signal is converted to digital signal only in a rising edge of the clock.

Figure 8B:
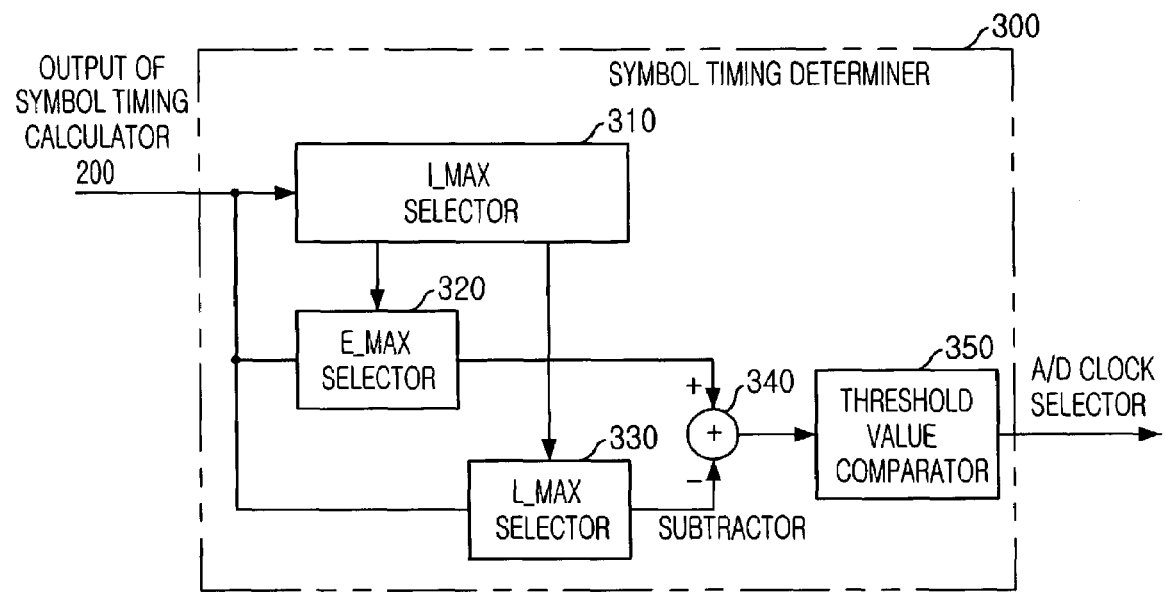
FIG. 8B is a detailed block diagram of the symbol timing determiner 300 in accordance with a preferred embodiment of the present invention.

FIG. 8B is a detailed diagram of the symbol timing determiner 300 in accordance with a preferred embodiment of the present invention.

As shown in FIG. 8B, the symbol timing determiner 300 includes an I_Max selector 310 for selecting a maximum sampling point (I_Max), an E_Max selector 320 for selecting an E_Max point, which is a certain number of symbols ahead of the I_Max, a L_Max selector 330 for selecting an L_Max point, which is a certain number of symbols behind from the I_Max, a subtractor and a threshold comparator 350. A symbol timing value outputted from the symbol timing calculator 200 is inputted to the I_Max selector 310, the E_Max selector 320 and the L_Max selector 330. The E_Max selector and L_Max selector 320 and 330 uses output values of the I_Max selector 310 for normalizing a value of the E_Max and the L_Max between 0 and 1.

An output value of the E_Max selector 320 and the L_Max selector 330 is inputted to the subtractor 340 and a result of the subtractor, which is difference of the output values of the E_Max selector 320 and the L_Max selector 330, is inputted to the threshold comparator 350. The threshold comparator 350 compares the difference to a preset threshold value and the result of the comparison is outputted to the A/D clock supplier 400. The A/D clock supplier 400 decides a phase of the A/D clock according to the result of the threshold comparator 350.

Figure 8C:
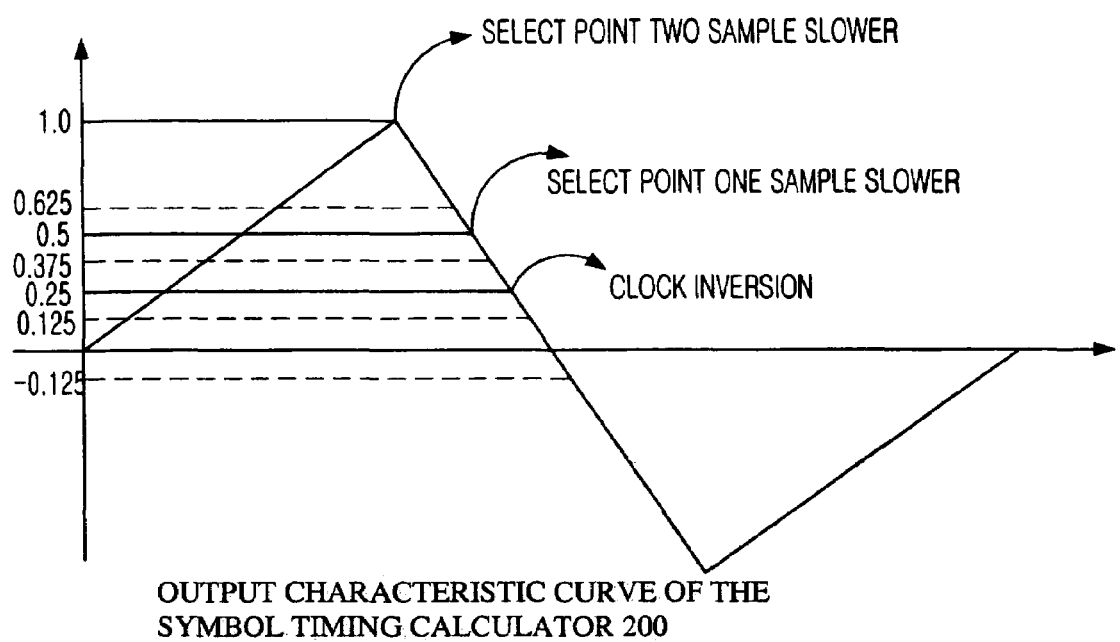
Figure 8D:
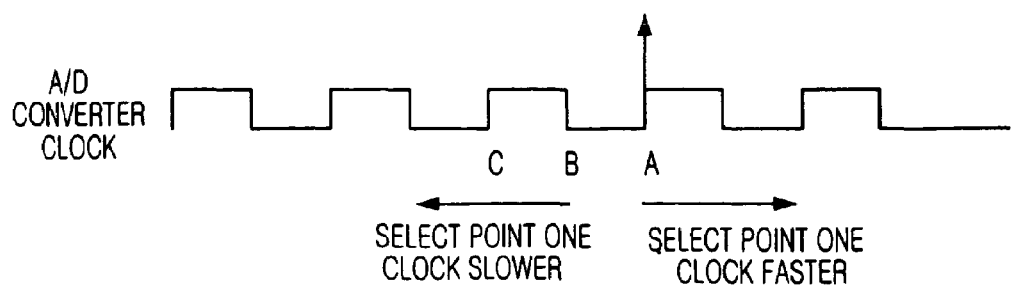
FIG. 8D is a waveform for explaining an operation of the threshold comparator 350 in accordance with the present invention.

FIG. 8C is a graph showing an output characteristic curve of the symbol-timing calculator in accordance with a preferred embodiment of the present invention and FIG. 8D is a waveform of a clock signal inputted to the A/D converter 100. The characteristic curve of FIG. 8C is gained based on a point 'A' in FIG. 8D and the A/D converter 100 uses two clock signal, original clock signal and reversed clock signal.

If a Max-estimation value between −0.124 and +0.125 is inputted to the threshold comparator 350, the A/D converter 100 uses the original clock signal. That is, the 'A' of FIG. 8D is used as the best point of the symbol synchronization. However if the Max-estimation value between +0.125 and +0.325 is inputted to the threshold comparator 350, the A/D converter 100 requires a reversed clock signal and the best point of the symbol synchronization is moved to 'B' in FIG. 8D. As a same reason, if the Max-estimation values inputted to the threshold comparator 350 are between +0.375 and +0.625, 'C' point will be used as the best point of symbol synchronization, which is one symbol behind from 'B'.

In a meantime, if the-Max-estimation value is smaller than −0.125, a sign of the value will be changed however, absolute values of the Max-estimation values and threshold value will not be changed since the characteristic curve is symmetry based on the I_Max. Therefore, the best point of symbol synchronization in FIG. 8D is changed to opposite direction.

Figure 9:
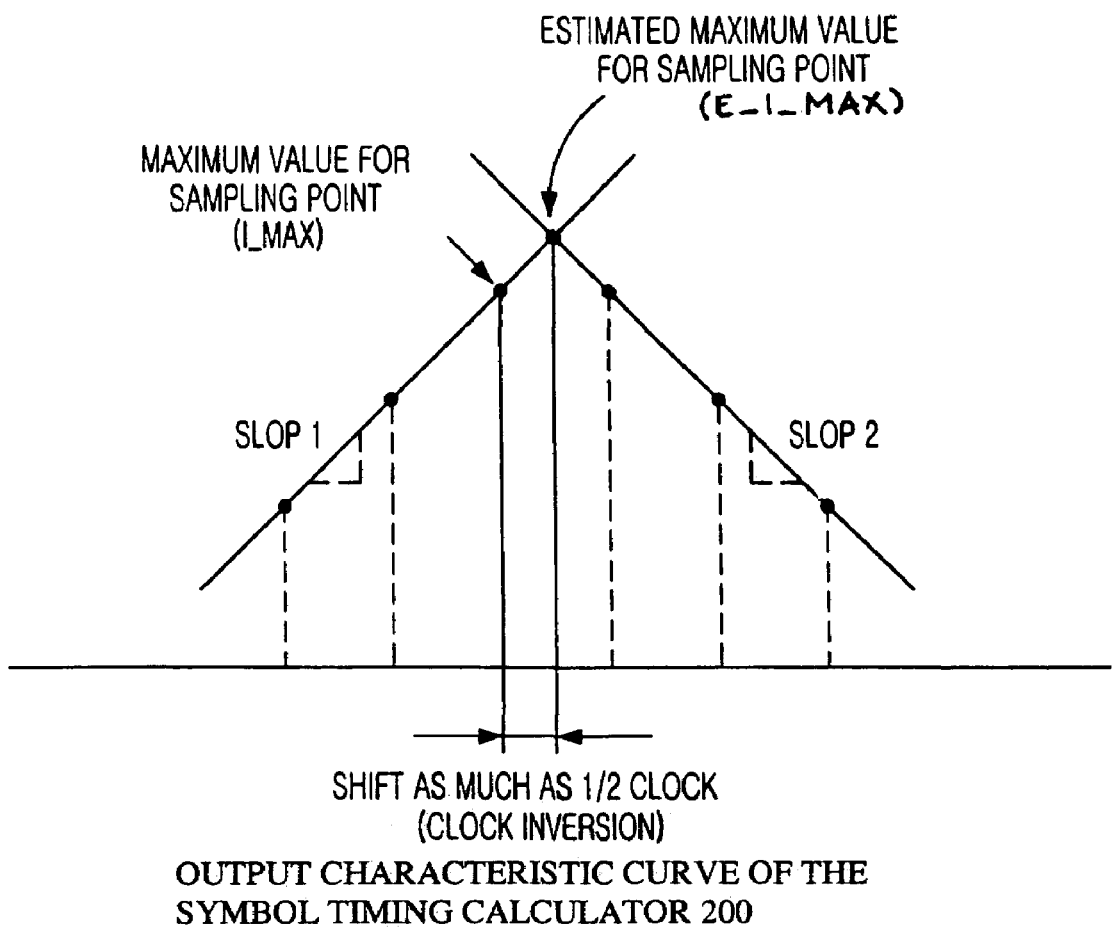
FIG. 9 is a graph showing another output characteristic curve of the symbol-timing calculator 200 to illustrate operations of the symbol timing determiner 300 that can be implemented on a micro processor, in accordance with the present invention.

FIG. 9 is a graph showing another output characteristic curve of the symbol timing calculator in accordance with the present invention. The symbol timing determiner's operations can be implemented as a micro processor such as a central processing unit (CPU). The graph in FIG. 9 shows operation principle of the algorithm.

By implementing the symbol timing determiner as a micro processor, the micro processor observes outputs of the symbol timing calculator 200 and considers the output characteristic curve is symmetric about a maximum symbol value. Finally, the micro processor estimates the output characteristic curve of the symbol timing calculator 200 at each sampling point. In the output characteristic curve estimated by the micro processor, a best point for symbol synchronization (E_I_Max) is a point of crossing the + slop (slop 1) and − slop (slop 2). Therefore, the micro processor controls the A/D clock supplier 400 to shift a clock phase as much as a difference between the E_I_Max and I_Max for supplying the clock phase to the A/D converter 100. In FIG. 9, the best point for symbol synchronization can be supplied to the A/D converter by shifting the clock phase as much as ½ clock. In other words, the A/D converter synchronizes symbols according a reversed clock. As mentioned above, the micro processor can exactly estimate the maximum value of symbol comparatively and it can be implemented to control the digital clock by the analog method. It is widely known to an ordinary skilled person so detailed explanation is omitted in here.

Figure 10A:
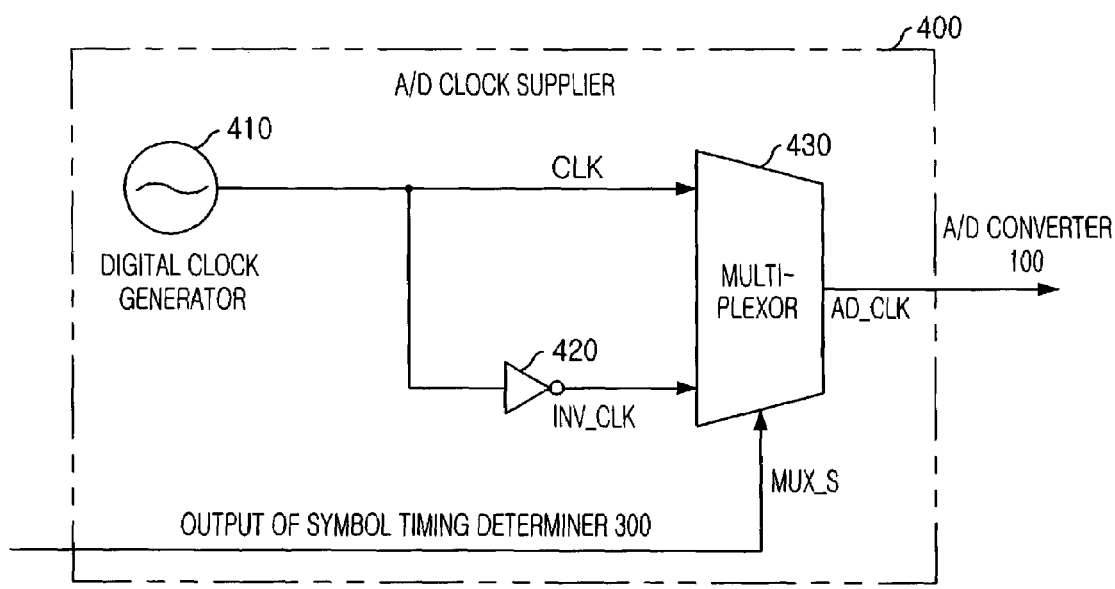
FIG. 10A is a detailed diagram illustrating the A/D clock supplier 400 in accordance with the present invention.

FIG. 10A is a detailed diagram illustrating the A/D clock supplier 400 in accordance with a preferred embodiment of the present invention.

Referring to FIG. 10A, the A/D clock supplier 400 includes a digital clock generator 410, an inverter 420, and a multiplexer 430. The digital clock generator 410 generates a digital clock and the digital clock is inverted by the inverter 420. The multiplexer 430 selects and supplies one of the digital clock CLK and the inverted digital clock INV_CLK as an A/D clock signal to the A/D converter 100.

Figure 10B:
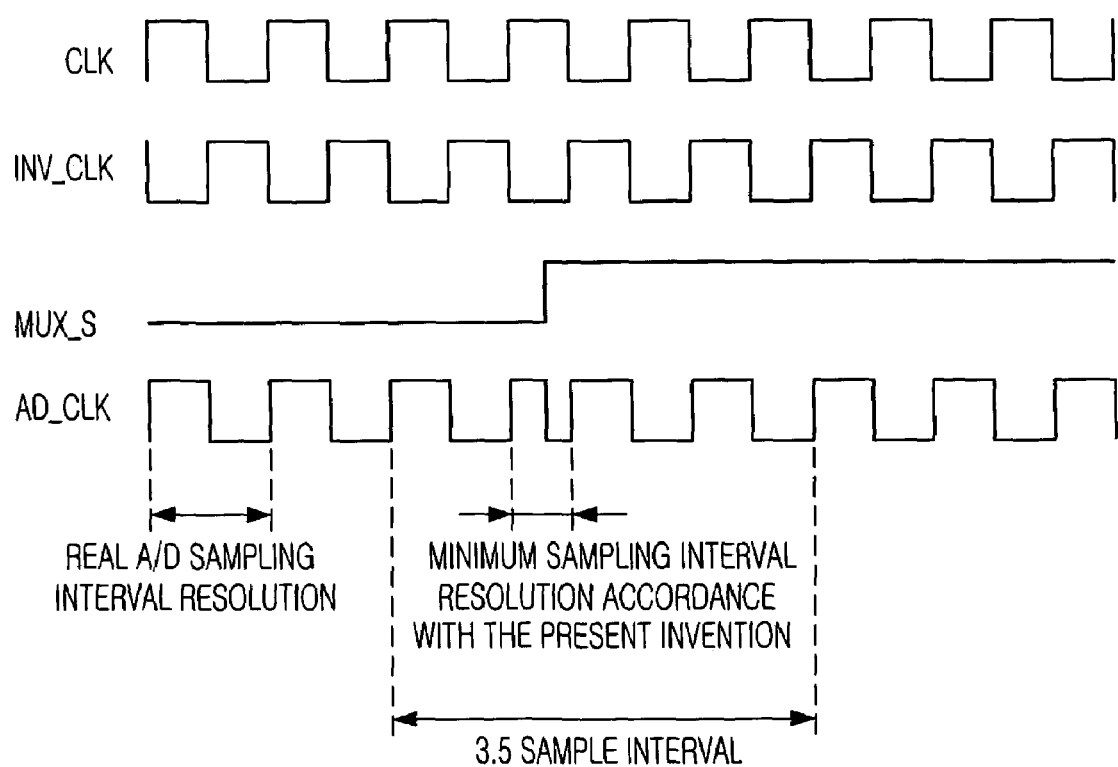
FIG. 10B shows waveforms related to an input/output clock of the A/D clock supplier in FIG. 10A.

FIG. 10B shows waveforms illustrating relation between input/output clocks of the A/D clock supplier in FIG. 10A.

Referring to FIG. 10B, if the multiplexor 430 is controlled by using a best symbol timing of the symbol timing determiner 300, two times better resolution than the original sampling clock resolution can be obtained. That is, in AD_CLK, CLK and INV_CLK are existed time-exclusively so sampling resolution of a point has no difference between CLK but in a view of long term control, it has two times better resolution than CLK.

Figure 10C:
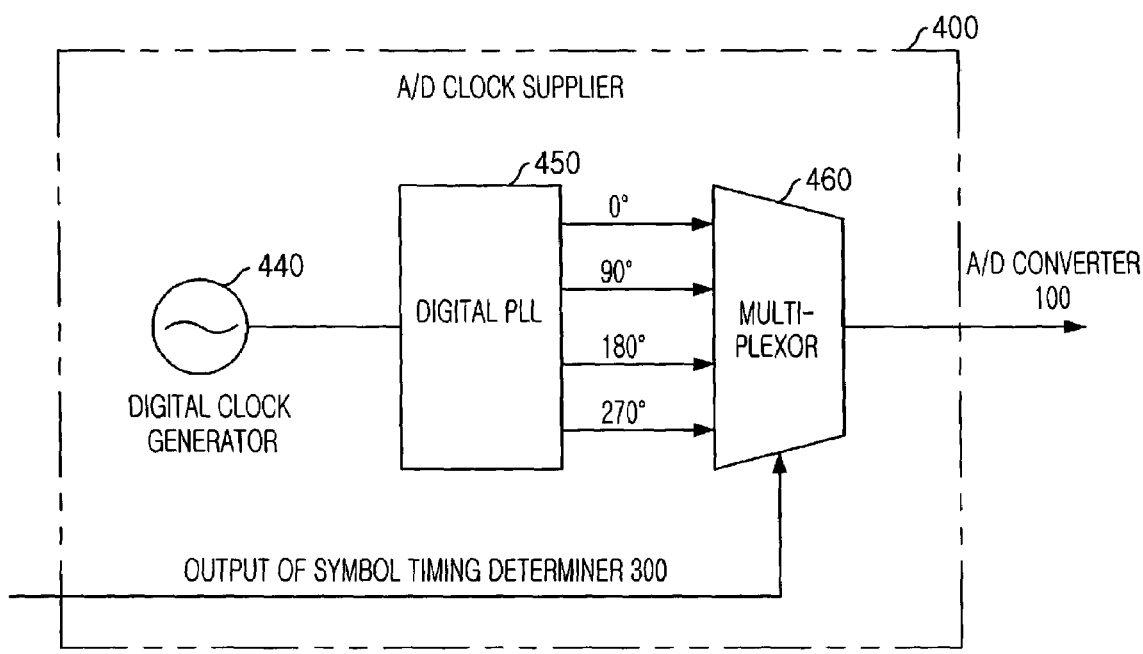
FIG. 10C is a diagram depicting the A/D clock supplier 400 in accordance with the present invention.

FIG. 10C is a diagram illustrating the A/D clock supplier 400 in accordance with another embodiment of the present invention.

Referring to FIG. 10C, the A/D clock supplier 400 includes a digital clock generator 440, a digital phase locked loop (PLL) 450 and multiplexer 460. The digital clock generator 440 generates a digital clock and the digital clock is transformed to multi-phase clocks having more than two phases by the PLL 450 and output the multiphase clocks to the multiplexer 460. The multiplexer 460 selects and supplies one of the multiphase clock as a control signal to the A/D converter 100.

As mentioned above, if the multiphase clock having a plurality of phases can be generated by using the digital PLL 450, then one of phase of the multiphase clock can be selected as AD_CLK according to the output of the symbol timing determiner 300. In the preferred embodiment, there are four phases existed, 0°, 90°, 180° and 270° as shown in FIG. 10C. In the preferred embodiment of the present invention, a sampling resolution can be increased by the number of selectable clock phases but a selection algorithm can be very complex. Also if the clock phase is unlimited, it gives same affection as the conventional analog clock control method. However, the present invention provides an adaptable apparatus and method having a simple configuration and same performance comparing to the conventional analog control method.

In a meantime, the preferred embodiments in FIGS. 10A to 10C is explained as inputting a digital clock from the internal digital clock generators 410 and 440 in the A/D clock supplier 400 but the digital clock can be inputted from an external device such as a clock device in the digital communication system.

The digital symbol synchronization method is explained as follows.

Figure 11:
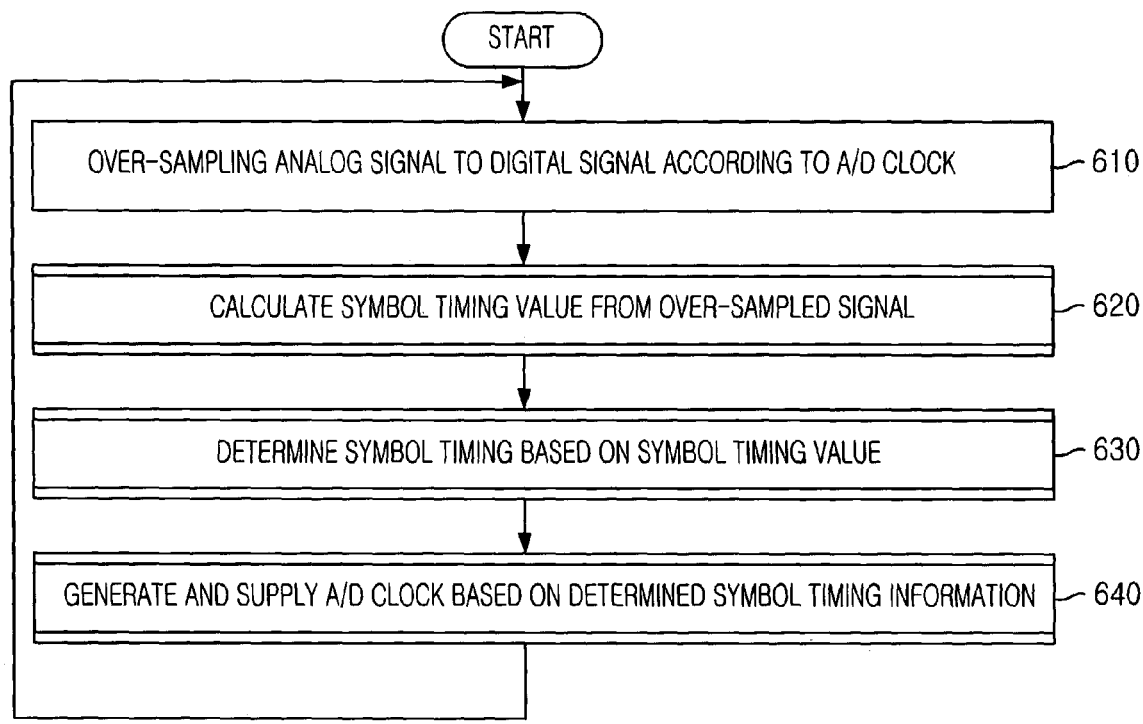
FIG. 11 is a flowchart of a digital symbol synchronization method in accordance with the present invention.

FIG. 11 is a flowchart of a digital symbol synchronization method in accordance with the present invention.

At first, an analog signal is over-sampled to a digital signal according to an A/D clock at step 610. Based on the digital signal, a symbol timing value is calculated at step 620. By using the symbol timing value, a symbol timing is determined at step 630. Finally, an A/D clock is determined according to the symbol timing and supplied for the over sampling process of step 610.

Figure 12:
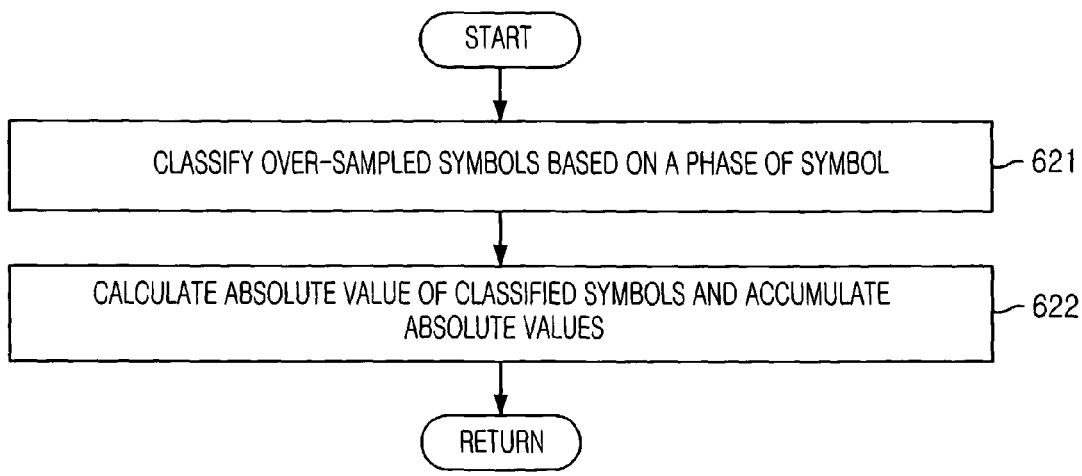
FIG. 12 is a detailed flowchart of the symbol timing value calculation step 620 in accordance with the present invention.

FIG. 12 is a detailed flowchart of the step 620 in accordance with the present invention.

At first, over-sampled symbols in the step 610 are classified based on a phase of the over-sampled symbol at step 621. After step 621, absolute values of the classified symbols are computed and the absolute values are accumulated at step 622.

Figure 13:
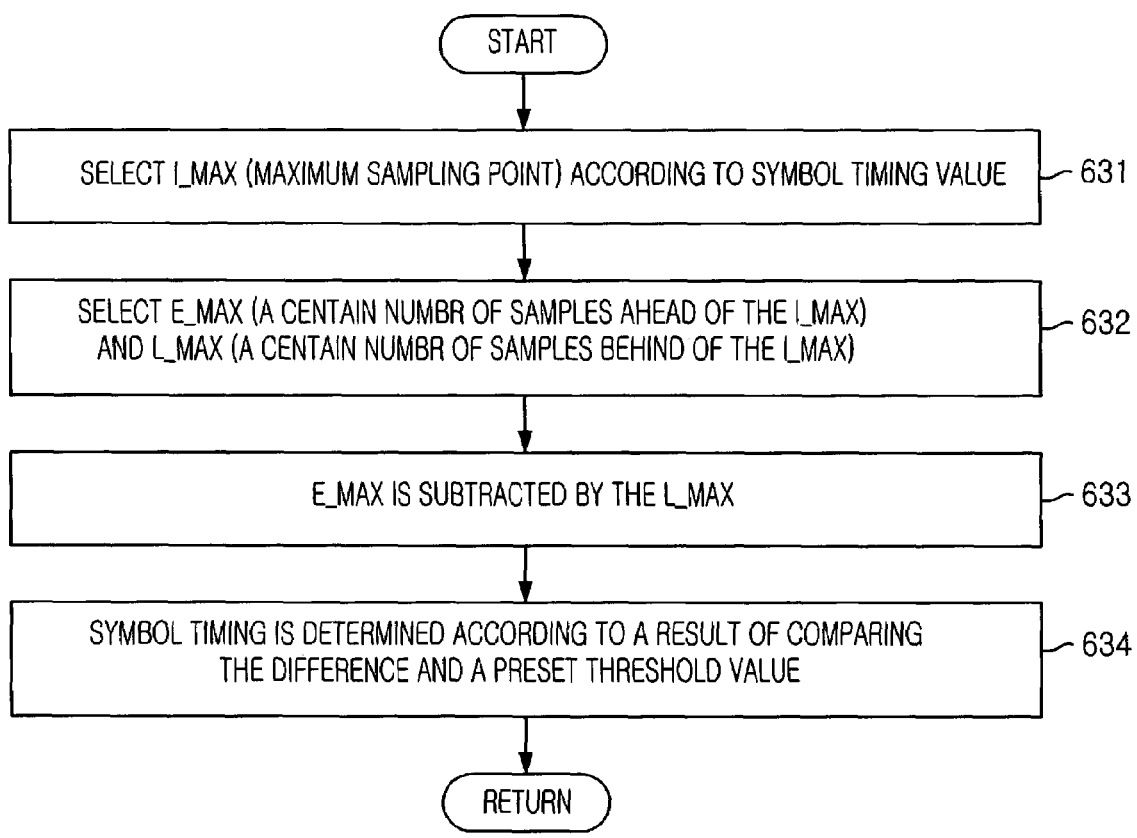
FIG. 13 is a detailed flowchart of the symbol timing determining step 630 in accordance with the present invention.

FIG. 13 is a detailed flowchart of the step 630 in accordance with the present invention.

At first, the maximum sampling point (I_Max) is selected according to the symbol timing value and an E_Max, which is a certain number of samples ahead of the I_Max, and L_Max, which is a certain number of samples behind of the I_Max, are selected at step 632.

After the step 632, the E_Max value is subtracted by the L Max value at step 633.

After the step 633, a symbol timing is determined according to a result of comparison the difference and a preset threshold value.

Figure 14A:
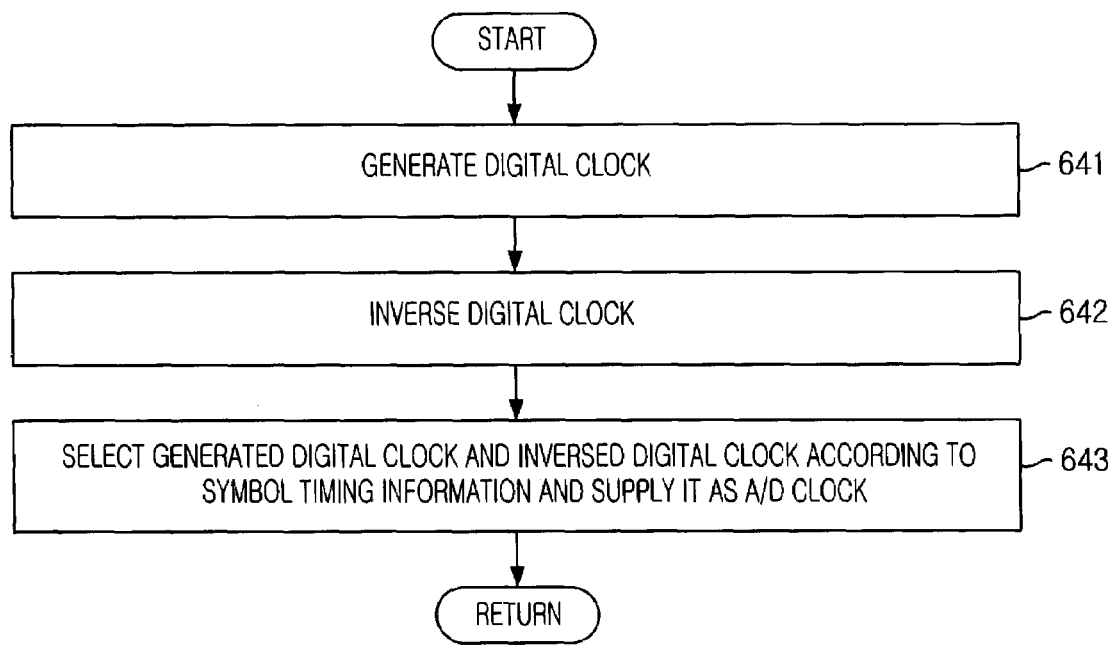
FIG. 14A is a detailed flowchart of a step supplying the A/D clock in accordance with a preferred embodiment of the present invention.

FIG. 14A is a detailed flowchart of the A/D clock supplying step in accordance with a preferred embodiment of the present invention.

At first, a necessary digital clock is generated to supply an A/D clock at step 641 and the generated digital clock is inversed at step 642.

After the step 642, the generated digital clock and the inversed digital clock are selected according to the symbol timing information and selected clock is supplied as an A/D clock at step 643.

Figure 14B:
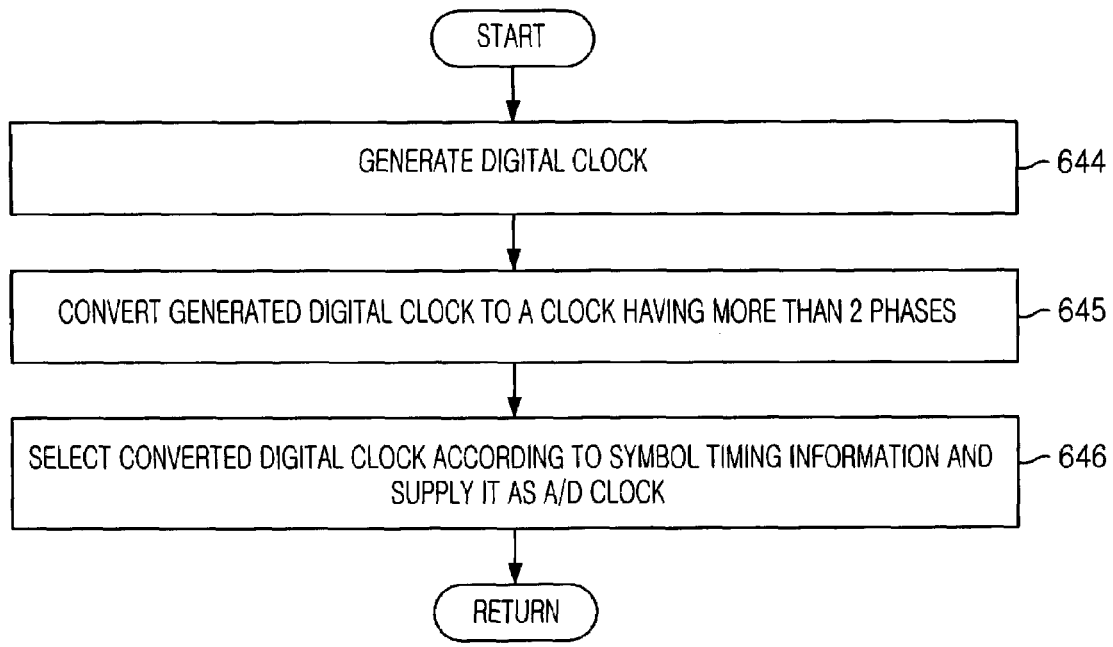
FIG. 14B is a detailed flowchart of the A/D clock supplying step in accordance with another preferred embodiment of the present invention.

FIG. 14B is a detailed flowchart of the A/D clock supplying step in accordance with another embodiment of the present invention.

At first, a necessary digital clock is generated to supply an A/D clock at step 644 and the generated digital clock is transformed as a multiphase clock having more than two phases at step 645.

Finally, one phase of the multiphase clock is selected according to the symbol timing information and supplied as an A/D clock.

As mentioned above, the present invention provides an apparatus and method performing over-sampling process in higher resolution than a sampling frequency by using only one A/D converter. Therefore, the present invention may increase economic efficient and reduce complexity of hardware.

In other words, the present invention can avoid complexity of the conventional analog control method and overcomes a limitation of sampling clock resolution used in the conventional A/D converter by directly controlling phases of input clock of the A/D converter and performing symbol synchronization of digital samples.

Also, the present invention can be utilized at not only continuous transmission method but also high-speed burst type communication system.

That is, if the present invention is implemented in a receiver of the digital communication system, complex analog control method can be avoid. It also can be implemented in a burst type non-continuous transmission system since a closed circuit control loop is not necessary to synchronize a symbol and the-digital sampling resolution can be increased too.

While the present invention has been described with respect to certain preferred embodiments, it will be apparent to those skilled in the art that various changes and modifications may be made without departing from the scope of the invention as defined in the following claims.

What is claimed is:

1. An apparatus for digital symbol synchronization, comprising:

A/D converting means for over-sampling an analog signal to a digital signal according to an Analog/Digital (A/D) clock and outputting over-sampled symbols;

symbol timing calculating means for calculating a symbol timing value based on the over-sampled symbols by receiving the over-sampled symbols, classifying the over-sampled symbols, accumulating absolute values of the classified symbols, and outputting the symbol timing value;

symbol timing determining means for determining a best symbol timing based on the symbol timing value and outputting the best symbol timing; and A/D clock supplying means for receiving the best symbol timing and supplying the A/D clock to the A/D converting means, wherein the A/D clock is determined according to the best symbol timing;

wherein the symbol timing calculating means includes:

sample arranging means for classifying the over-sampled symbols of which phases are the same based on a phase of the over-sampled signal-symbols in a symbol interval into a sample unit and outputting classified symbols; and symbol integrating means for accumulating the absolute values of the classified symbols and outputting an integration value as the symbol timing value.

2. The apparatus as recited in claim 1, wherein the sample arranging means includes two or more delayers and the over-sampled symbols are sequentially passed through the delayers for classifying the over-sampled symbols.

3. The apparatus as recited in claim 2, wherein the symbol timing determining means includes:

I_Max selecting means for selecting a maximum sampling point (I_Max) based on the symbol timing value and outputting an I_Max value;

E_Max selecting means for selecting an E_Max, which is a point of a certain number of samples behind from the I_Max based on the symbol timing value and the I_Max and outputting an E_Max value;

L_Max selecting means for selecting a L_Max, which is a point of a certain number of samples ahead from the I_Max based on the symbol timing value and the I_Max and outputting a L_Max value;

subtracting means for calculating a difference between the E_Max value and L_Max value and outputting a difference value; and threshold comparing means for outputting the best symbol timing by comparing the difference value and a threshold value to the A/D clock supplying means.

4. The apparatus as recited in claim 3, the symbol timing determining means is implemented as a micro processing unit for controlling the A/D clock supplying means to shift a clock phase as much as difference of the an estimated maximum sampling point (E_I_Max and I_Max by observing an output characteristic curve of the symbol timing calculating means in order to find a crossed point of a plus slop and a minus slop and estimating the E_I_Max based on the crossed point.

5. The apparatus as recited in claim 2, wherein the A/D clock supplying means includes:

digital generating means for generating a digital clock and outputting the digital clock;

inversing means for inversing the digital clock and outputting an inversed digital clock; and selecting means for selecting one of the digital clock and the inversed digital clock and supplying a selected clock to the A/D converting means as said A/D clock.

6. The apparatus as recited in claim 2, wherein the A/D clock supplying means includes:

inversing means for inversing a digital clock inputted from an external device and outputting an inversed digital clock; and selecting means for selecting one of the digital clock from the external device and the inversed digital clock inversed based on the best symbol timing and supplying a selected clock to the A/D converting means as said A/D clock.

7. The apparatus as recited in claim 2, wherein the A/D clock supplying means includes:

digital clock generating means for generating a digital clock and outputting the digital clock;

clock phase transforming means for transforming the digital clock to a multiphase clock having more than two phases; and selecting means for selecting one phase of the multiphase clock based on the best symbol timing and supplying a selected phase clock to the A/D converting means as said A/D/ clock.

8. The apparatus as recited in claim 2, wherein the A/D clock supplying means includes:

clock phase converting means for receiving a digital clock from an external device and converting the received digital clock to a multiphase clock having two or more phases; and selecting means for selecting one phase of the multiphase clock based on the best symbol timing and supplying a selected phase clock to the A/D converting means as said A/D clock.

9. A method for digital symbol synchronization, comprising the steps of:

a) generating over-sampled an analog signal to a digital signal according to an Analog/Digital (A/D) clock;

b) calculating a symbol timing value based on the over-sampled symbols by classifying the over-sampled symbols and accumulating absolute values of the classified symbols;

c) determining a best symbol timing based on the symbol timing value and d) supplying the A/D clock according to the best symbol timing;

wherein the step b) includes the steps of:

b1) generating classified symbols by classifying the over-sampled symbols of which phases are the same based on a phase of the over-sampled symbols in a symbol interval into a sample unit; and b2) calculating an integration values by obtaining absolute values of the classified symbols and accumulating the absolute values in a certain interval.

10. The method as recited in claim 9, wherein the step b1) includes the step of:

delaying the over-sampled symbols by sequentially passing the over-sampled symbols through two or more sample delayers for classifying.

11. The method as recited in claim 10, wherein the step c) includes the steps of:

c1) selecting a maximum sampling point (I_Max) based on the symbol timing value;

c2) selecting an E_Max which is a point of a certain number of samples behind from the I_Max, based on the symbol timing value and the I_Max;

c3) selecting a L_Max which is a point of a certain number of samples ahead from the I_Max, based on the symbol timing value and the I_Max;

c4) calculating a difference value between the E_Max and the L_Max; and c5) determining the best symbol timing by comparing the difference value and a threshold value.

12. The method as recited in claim 11, the step c) includes the steps of:

c1) estimating an estimated maximum sampling point (E_I_Max) by finding a crossed point of a plus slop and a minus slop of a characteristic curve of the symbol timing value; and c2) determining the best symbol timing for shifting a phase of a clock as much as a difference between the I_Max and the E_I_Max.

13. The method as recited in claim 10, wherein the step d) includes the steps of:

d1) generating a digital clock;

d2) generating an inversed digital clock by inversing the digital clock; and d3) selecting one of the digital clock and the inversed digital clock based on the best symbol timing and supplying a selected clock as the A/D clock.

14. The method as recited in claim 10, wherein the step d) includes the steps of:

d1) generating an inverted digital clock by inverting a digital clock inputted from an external device; and d2) selecting one of the digital clock and the inverted digital clock based on the best symbol timing and supplying a selected clock as the A/D clock.

15. The method as recited in claim 10, wherein the step d) includes the steps of:

d1) generating a digital clock;

d2) converting the digital clock to a multiphase clock having two or more phases; and d3) selecting one phase of the multiphase clock based on the best symbol timing and supplying a selected phase clock as the A/D clock.

16. The method as recited in claim 10, wherein the step d) includes the steps of:

d1) receiving a digital clock from an external device and converting the digital clock to a multiphase clock having two or more phases, and d2) selecting one phase of the multiphase clock based on the best symbol timing and supplying the selected clock as the A/D clock.

* * * * *